United States Patent
Contractor et al.

(10) Patent No.: US 10,795,896 B2
(45) Date of Patent: Oct. 6, 2020

(54) SYSTEMS AND METHODS FOR AUTOMATICALLY IDENTIFYING SPECIFIC TEAMS OF USERS TO SOLVE SPECIFIC AND REAL-TIME PROBLEMS

(71) Applicant: Northwestern University, Evanston, IL (US)

(72) Inventors: Noshir S. Contractor, Evanston, IL (US); Harshad E. Gado, Evanston, IL (US); Anup S. Sawant, Evanston, IL (US)

(73) Assignee: Northwestern University, Evanston, IL (US)

(*) Notice: Subject to any disclaimer, the term of this patent is extended or adjusted under 35 U.S.C. 154(b) by 181 days.

(21) Appl. No.: 15/927,721

(22) Filed: Mar. 21, 2018

(65) Prior Publication Data

US 2018/0276219 A1    Sep. 27, 2018

Related U.S. Application Data

(60) Provisional application No. 62/474,351, filed on Mar. 21, 2017.

(51) Int. Cl.
| | |
|---|---|
| *G06F 16/30* | (2019.01) |
| *G06Q 10/06* | (2012.01) |
| *G06F 16/2457* | (2019.01) |
| *G06F 16/248* | (2019.01) |
| *G06F 16/951* | (2019.01) |
| *G06Q 50/00* | (2012.01) |
| *G06Q 10/10* | (2012.01) |

(52) U.S. Cl.
CPC ...... *G06F 16/24578* (2019.01); *G06F 16/248* (2019.01); *G06F 16/24575* (2019.01); *G06F 16/951* (2019.01); *G06Q 10/063112* (2013.01); *G06Q 10/10* (2013.01); *G06Q 50/01* (2013.01)

(58) Field of Classification Search
None
See application file for complete search history.

(56) References Cited

U.S. PATENT DOCUMENTS

2016/0026920 A1*    1/2016   Sullivan ............... G06F 16/438
                                                                706/11

OTHER PUBLICATIONS

Wu, Jlan et al. Trust based consensus model for social network in an incomplete linguistic information context. Applied Soft Computing 35. 2015. pp. 827-839. Feb. 2015.*

* cited by examiner

*Primary Examiner* — Tuankhanh D Phan
(74) *Attorney, Agent, or Firm* — Banner & Witcoff, Ltd.

(57) ABSTRACT

Aspects of the present disclosure include a system that automatically defines and assembles a group of users capable of solving a particular problem, such as problems associated with network platforms and infrastructures. The group of users are identified from user data captured while users interact within and throughout a network, such as a social network.

15 Claims, 5 Drawing Sheets

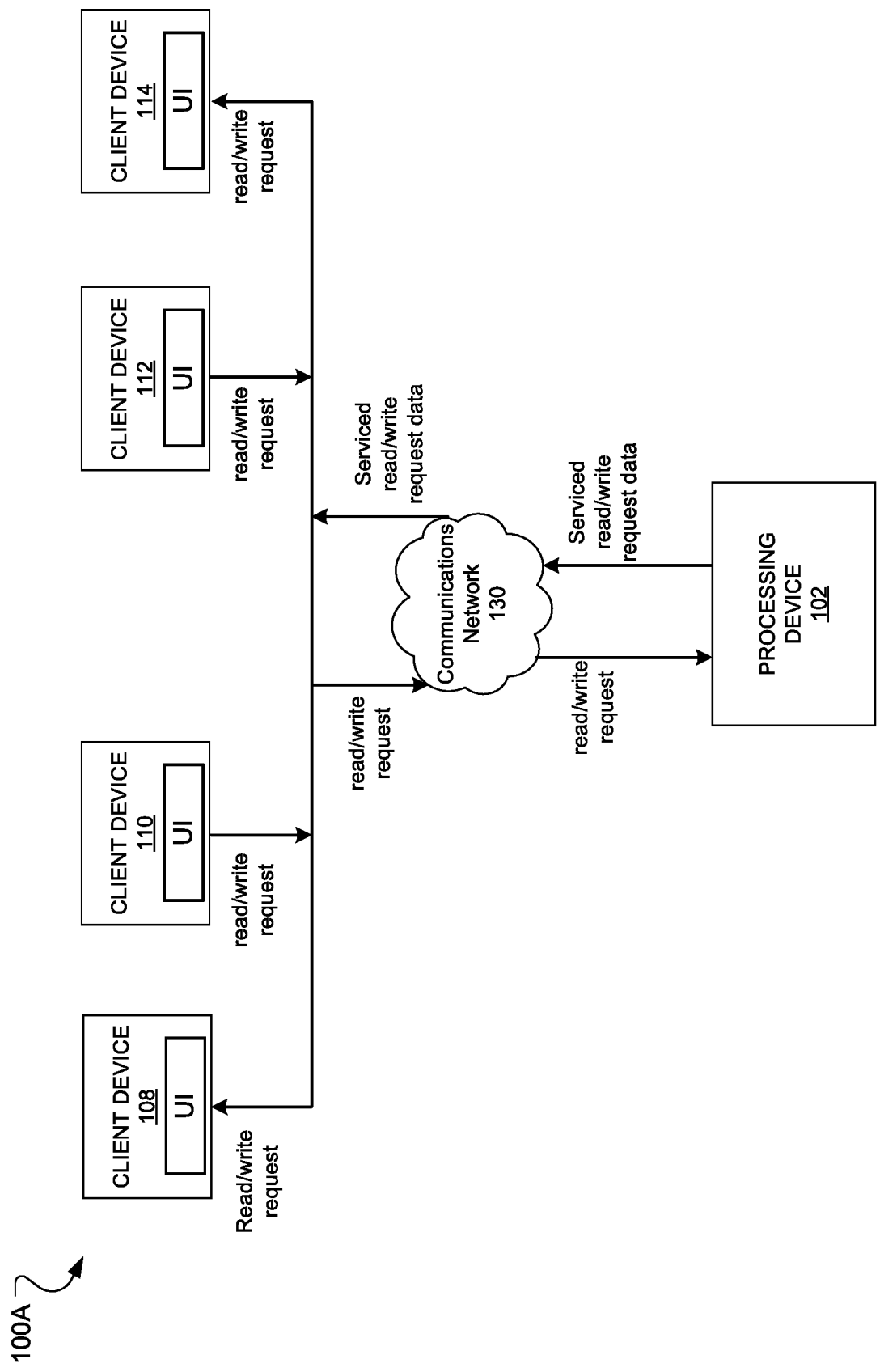

SYSTEMS AND METHODS FOR AUTOMATICALLY IDENTIFYING SPECIFIC TEAMS OF USERS TO SOLVE SPECIFIC AND REAL-TIME PROBLEMS

CROSS-REFERENCE TO RELATED APPLICATIONS

The present non-provisional utility application claims priority under 35 U.S.C. § 119(e) to provisional application No. 62/474,351 entitled "Systems And Methods For Automatically Identifying Specific Teams Of Users To Solve Specific And Real-Time Problems" filed on Mar. 21, 2017, and which is hereby incorporated by reference herein.

STATEMENT REGARDING FEDERALLY-SPONSORED RESEARCH

This invention was made with government support under ULI RR025741 awarded by the National Institutes of Health and BCS0940851, CNS1010904, IIS0838564, OCI0904356 awarded by the National Science Foundation and W911NF-09-02-0053 awarded by the Army Research Laboratory (ARL). The government has certain rights in the invention.

TECHNICAL FIELD

Aspects of the present disclosure relate to computer systems, and more specifically, to computer systems that automatically select or otherwise logically categorizes specific users of a social network into a team or group to solve a specific problem.

BACKGROUND

Social networking platforms enable large groups of people to communicate and collaborate with others they know or with people to which they are directly connected. However, typical social networking platforms are limited in their ability to enable certain users to identify groups and/or teams of people who are relevant to a specific problem in which the certain user may be interested in solving. For example, typical social networking platforms require a user to engage in a manual search process involving broad and abstract search terms that result in the identification of unsuitable team members. And the search process is often times tedious, time-consuming, and expensive.

In the context of enterprise-level software systems and information technology infrastructures and architectures (e.g., data centers), large support teams, connected via a network, are generally responsible for handling any problems associated with the infrastructures and architectures. Often times, a ticket is created when a problem is identified that includes a description of the problem, a priority level, and a deadline for which the problem needs to be resolved. The ticket is then transmitted throughout a network (e.g., a social network) of users capable of solving the problem. Providing the ticket to the appropriate team of problem solvers, is critical.

It is with these concepts in mind, among others, that various aspects of the present disclosure were conceived.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

FIG. 1A is a block diagram illustrating a computing architecture for automatically assembling groups or teams of users of a social network or other connected network platform, according to aspects of the present disclosure.

DETAILED DESCRIPTION

Figure 1B:
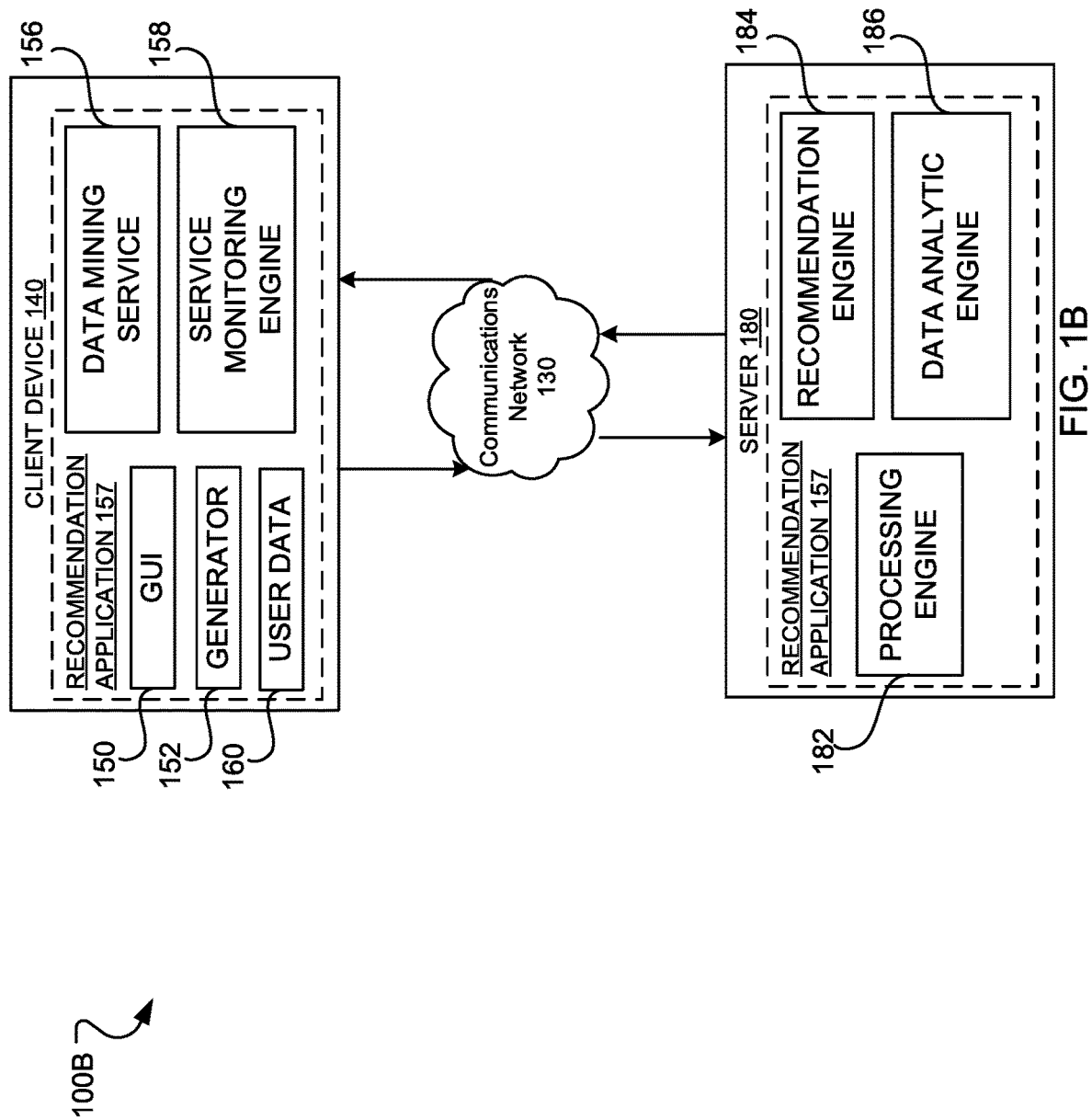
FIG. 1B is a block diagram illustrating various physical components of a computing architecture for assembling groups or teams of users of a social network or other connected network platform, according to aspects of the present disclosure.

Aspects of the present disclosure involve a data processing and/or social networking platform that includes specific programming details and mechanisms associated with automatically defining and assembling a group of users, referred to as a team. In various aspects, the data processing and social networking platform includes a computing device (or multiple devices) that are configured to automatically assemble a group of users into a specific team optimized to solve a specific problem. The groups of users are defined and/or otherwise assembled by the system based on preferences of a specific user interested in assembling the team and/or based on the skill sets, activities, and demographics of the available pool of users from which the team is assembled. In one specific example, the system may execute one or more programming instructions (e.g., an algorithm) that generates or otherwise displays personalized questions relating a user's skill set, demographics, and/or other information that may uniquely identify a user and the user's particular skill set and capabilities, as well as questions relating to a given user's previous working relationships with other users.

The questions may be transmitted (e.g., in real-time), to one or more client devices accessible by various users of the social networking platform. More specifically, the questions may be presented to users via one or more interactive interfaces, graphical-user interfaces, dashboards and/or portals generated by the computing device or system, and thereby enable the users of the network to provide input responding to the various questions.

The system employs a recommendation engine that automatically executes one or more matching and ranking algorithms to identify potential users of the social network as team members. Stated differently, the system generates a recommendation of team of specific members, based on input received from the users and team preferences of the specific user interested in assembling the team. The various one or more interactive interfaces, graphical-user interfaces, dashboards and/or portals are dynamically driven by the recommendation engine to present, in real-time, the potentially available teams that are currently capable of solving the user's current technical problem. For example, often, it is the case where a team of users immediately available to solve a specific problem may not be available in the future. Thus, the system provides the teams in real-time and continuously updates the recommendation to ensure that the identified team of users are always available. The user assembling the team interacts with the one or more interactive interfaces, graphical-user interfaces, dashboards and/or portals to accept and/or deny the recommended users and/or teams of users and ultimately invite the users to the team. In the event that a team member or user becomes unavailable, the graphical user-interface may provide visual indicators indicative of the specific user's unavailability (or availability in the event the user is accessible).

In some embodiments, large amounts of data corresponding to various communications and computing-related activities, identified and/or otherwise obtained by the system may be analyzed to identify certain aspects of a particular user, or team of users, such as: conversational behavior; current projects; current skill sets; or other important aspects indicating the capabilities and relevance of a user or team of users. Such information may be analyzed when identifying individuals who might be able to help or contribute to solving the specific problem in which the interested user is focused on solving (i.e., preferences). The recommendation engine may process such data and automatically generate a user profile, which may be automatically updated for storage and later retrieval, may include such information for use in generating a team recommendation. The data corresponding to various communications and computing-related activities may include emails, documents, phone calls, instant messages, meeting invites, calendar, and other related information stored in and retrieved from a given user's computer, PDA, smartphone, or web applications, etc. Such data may include a large amount of data associated with previously generated teams (e.g., historical data). The system may receive such data in raw form and extract it down into a dataset that is useful in identifying users for team members.

Accordingly, one illustrative example of the techniques described herein is to assemble a team of one or more users capable of solving a particular and specific problem, based on all of the data (e.g., digital trace data) surrounding a given user's current projects, products, competencies and/or interactions with other users and store such information as a user profile so that that the users can be easily found in searches for persons with a desired set of core competencies or connections.

To ensure that the assembled team has the capability to solve the specific problem identified by the user interested in assembling a team, the system may include a mechanism that automatically quantifies the degree to which the users recommended for the team have the skillsets and/or capabilities to solve the specific problem. Specifically, the mechanism may generate a series of data analytics that quantify: 1) a user's actual individual expertise with respect to the specific problem being solved; 2) a user's relationship with other users within the team; 3) a user's relationship with other users external to the team; 4) a path of social connection through which the team members were identified; and/or the like. Any of such data analytics may be provided for display via the one or more interactive interfaces, graphical-user interfaces, dashboards and/or portals generated by the computing system. Moreover, any of such generated analytics may be used to generate recommendations of new teams for similar and/or related problems.

The various concepts described herein are described in the context of a building teams for solving problems in the information technology industry, particularly within the context of resolving technical issues based on trouble tickets in an information technology infrastructure. It is contemplated, however, that the various concepts described herein may be applied to other industries and contexts.

FIG. 1A illustrates a computing architecture including a social networking platform 100A capable of automatically generating recommendations of teams and/or otherwise assembling teams, according to aspects of the present disclosure. As illustrated, the computing architecture 100A includes a processing device 102 (e.g., a server computing device) capable of servicing requests to automatically generate recommendations of a team of users assembled to solve a particular problem. The requests may be received from one or more client devices 108-114 distributed throughout and/or otherwise accessible (i.e., networked) via a communications network 130 (e.g., a cloud computing arrangement), which may be an IP-based telecommunications network, the Internet, an intranet, a local area network, a wireless local network, a content distribution network, or any other type of communications network, as well as combinations of networks. The one or more client devices 108-114 may be any of, or any combination of, a personal computer; handheld computer; mobile phone; digital assistant; smart phone; server; application; and the like. In one embodiment, each of the one or more client devices 108-114 may include a storage appliance and/or a processor-based platform that operates on any suitable operating system, such as Microsoft® Windows®, Linux®, and/or the like that is capable of executing software and issuing requests.

FIG. 1B depicts various physical and logical components for implementing various aspects of the social network platform depicted in FIG. 1A. In the illustrated embodiment 100B of FIG. 1B, a client device 140 is shown to include a graphical user interface 150, a user profile generator 152, a data mining service 156, and a service monitoring engine 158, all of which, together, form a recommendation application 157. Graphical user interface 150 represents the user interface that contains profile information and a mechanism to control and manage various features of the recommendation application 157, as well as receive user input.

Recommendation application 157 represents generally any combination of hardware, software, or firmware configured to process communications sent and received over the graphical user-interface 150. User profile generator 152 is responsible for processing and generating profile information of different types (partial and complete) based on the data mining service 156, which reads and/or otherwise obtains and processes user data 160 residing on the client (e.g., one or more of the client devices 108-114) or that is communicated over the network 130. The user data 160 may include one or more of a data input, calendar, emails, contacts, chats, data files, documents, browser searches, or call records, and/or the like (e.g., digital trace data). User data 160 represents the information about users' communications or interactions with other users, or any other information which signifies the user's expertise, interest, skills and behavior. The data mining service 156 processes the user data 160 and may generate various data analytics explaining the data. User profile generator 152 uses this data to create a user's complete profile or the partial profiles of other users.

Service monitoring engine 158 provides information about changes made to any application or user data 160 residing on client 140. For example, where client 140 is a computer being used by a first user and the user data includes text messages, service monitoring engine 158 signals data mining service 156 upon arrival of new message, which processes the newly arrived text message and generates data identifying subjects and concepts related to the text message, along with the people included or otherwise involved with the message. So for example, if the same user sends a text message to a second user that discusses failed server components and routers, the data mining service 156 processes the text message and generates concepts such as servers, networking, failures, along with information identifying the users involved in the text message. All of such information may be stored in a database or other storage associated with, for example, the processing device 102.

Application server 180 (e.g., the processing device 102) represents generally any combination of hardware, software, or firmware configured to receive requests from the client device 140, process the requests, and return a response. In one specific example, the application server 180 may be a hardware device, such as a server computing device. Application server 180 includes portions of the recommendation application 157 and further includes a processing engine 182, which represents a network interface for the client 140 that may be used for team recommendation requests, query, and retrieval. For example, in processing a team recommendation request from the client 140, the processing engine 182 forwards the profile information and/or other relevant information included in the request to a recommendation engine 184 that automatically generates a recommended team capable solving the particular problem of interest, based on the information submitted by the client-side recommendation application 157 about the user's expertise, interests, skills and behavior. Stated differently, the recommendation engine 184 may group certain users, or user-profiles, into teams or groups based on their expertise and communication behavior defined within the user profile and user data 160. Since new and updated profile information and/or user data is continuously submitted to the server 180 by the client device 140, the recommendation engine 184 may be continuously queried to obtain current teams and groups.

Figure 2:
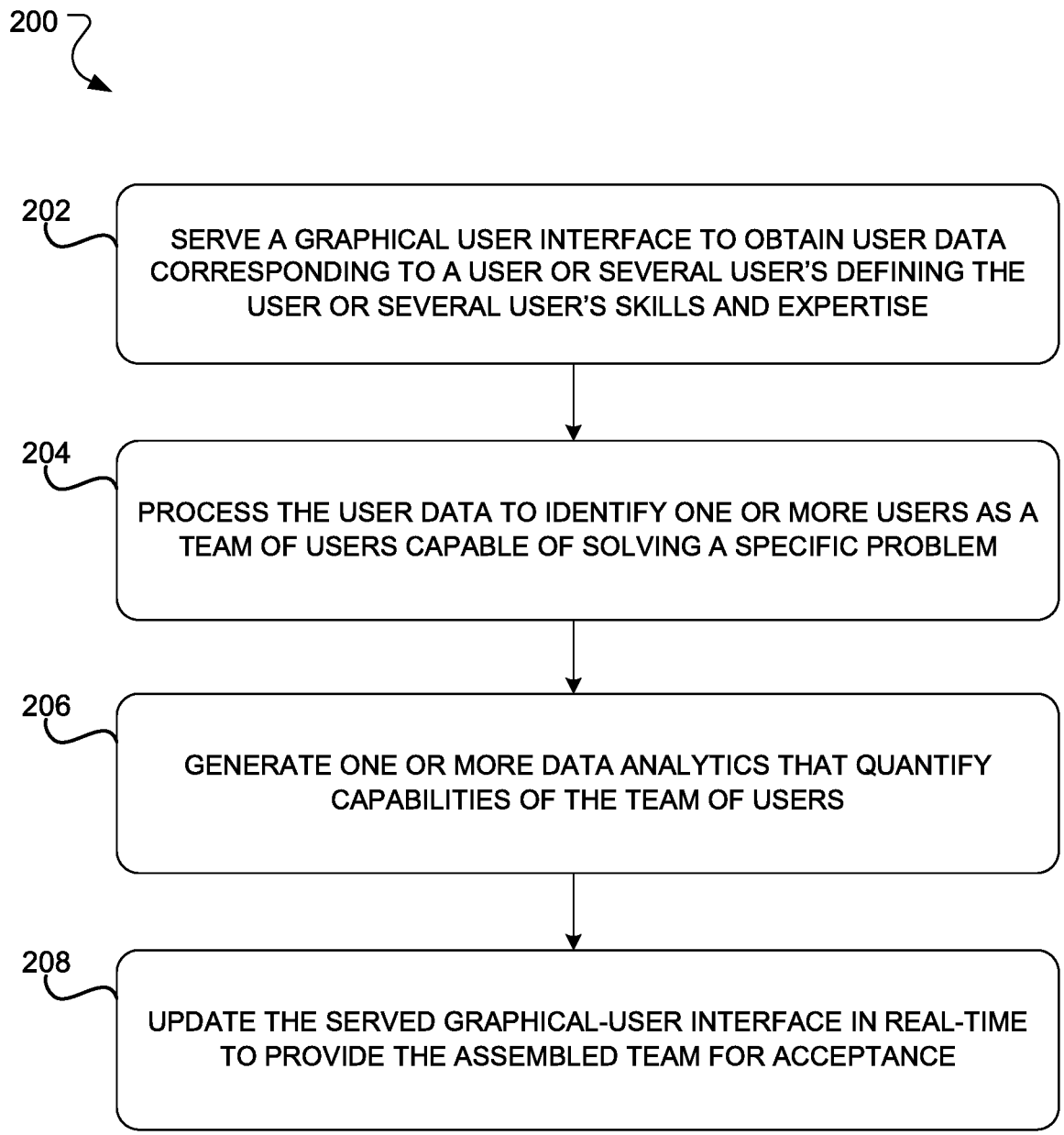
FIG. 2 is a flowchart illustrating an example process for automatically assembling groups or teams of users of a social network or other connected network platform, according to aspects of the present disclosure.

Referring now to FIG. 2 and with reference to FIG. 1, an illustrative process 200 for automatically assembling teams is provided. As illustrated, process 200 begins with serving a graphical user-interface to obtain user data defining the skills and expertise of a user (e.g., user data) or several users (operation 202). For example, the graphical user-interfaces may obtain input corresponding to questions relating to a pool of user's skill sets, demographics, activity histories, social network history, and/or other data and information (all of which may be referred to as User data). Referring again to FIG. 1, the processing device 102 provides a mechanism, such as a graphical user-interface ("GUI") that includes various interactive components, forms, buttons, selections, forms, fields, streaming capabilities, etc., any of which a user may interact with to provide input relating the user's current skill set, current projects, demographics, current network and/or social connections, and/or other information that may uniquely identify the user and the user's particular skill set and capabilities (i.e., user data). In one specific example, the various interfaces may be used to guide users through a user survey including a series of questions and/or prompts (enabled by the components of the GUI) that allows the user to provide such information. In other embodiments, the data may be retrieved from a database external to the computing system 202.

In another example, the processing device 102 may obtain user data based on the network context and behaviors of a user for processing. For example, the processing device 102 may identify a specific uniform resource locator ("URL") at which the user is interacting, an application (e.g. a software application provided as a service) for which the user is interacting, and/or any other social networking information sources (e.g., websites, platforms, data feeds) with which the user may be interacting, and obtain metadata associated with such information sources, applications, etc., and process the metadata to determine topics, subjects, and/or concepts that the user may be associated with. To facilitate the determination of the network context of a given user, various network locations may be identified and/or information sources may be aggregated, for example, by hierarchy or topic, and may be designated accordingly. Additionally, the important of such network locations and/or information sources may be weighted as levels of importance.

Referring again to FIG. 2, the user data may be processed to identify or otherwise assemble one or more users into a team of users capable of solving a specific problem (operation 204). Referring to FIG. 1, the recommendation engine 204 of the processing device 102 receives a query from a user interested in assembling a team to solve a specific problem, and based on the query, executes an algorithm that generates a prediction of one or more team members capable of resolving the specific problem identified in the query. To predict the appropriate users, User data for each potential user included in the team may be weighted and matched against standard characteristics of the specific problem for which the team is being assembled to solve. For example, when a user generates a query with desired set of preferences and their respective importance, the system automatically searches through the database and calculates scores for each individual potential team member with respect to the user's query. As an example, if a user prefers a team member with high leadership and importance 'X' (Assuming total possible importance across all questions is Y) then the system would generate a score for each individual by squash {user's own rating on leadership*(X/Y)}, where, squash is a function that limits the value between 0-1. Such a calculation is done across the entire set of preferences, which include their preferences about leveraging their network, personality traits (such as leadership, creativity, team player), their desire for (or against) homophily on various dimensions (such as age, gender, ethnicity, work schedules) and task related expertise and interests. The ratings are then summed up to get a final score. Individuals are then ranked according to their final scores to present the list of potential team members.

In some embodiments, the teams may be assembled, in part, based on preferences of the user interested in assembling the team. More specifically, a user interested in assembling a team may interact with the graphical user-interface 150 of the one or more client devices 108-114 and/or the client device 140 to provide preferences of the types of users the interested user would like to see included in any team assembled. Subsequently, the specified preferences may be processed by the recommendation engine 184 of the server 180 to identify users of interest. For example, in some embodiments, the specified preferences may be used to generate a preferences model (e.g., a hierarchy) which may be used to produce a ranking of one or more users included in the team, in accordance with the specified preferences.

In yet another example, the network context of a user may be used to identify team members. More specifically, the network context of a user "A" may include a series of URLs associated with a specific topic. The system may track the URLs to determine what other users of the social network are accessing the URLs of the user "A" network context during some period of time. Then, based on the weighting of the specifically accessed URL, the system may determine that the accessing user should be included in the team.

Referring again to FIG. 2, the received information may also be processed to generate one or more data analytics that quantify the capabilities of any assembled team (operation 206). More specifically, the data analytic engine 186 of the processing device 184 may execute various algorithms and/or processes of the recommendation application 157 that automatically transform the received data into one or more data analytics, and automatically restructures and/or otherwise stores the generated analytic in a format that is interpretable by the processing device 102 or elsewhere.

Figure 3:
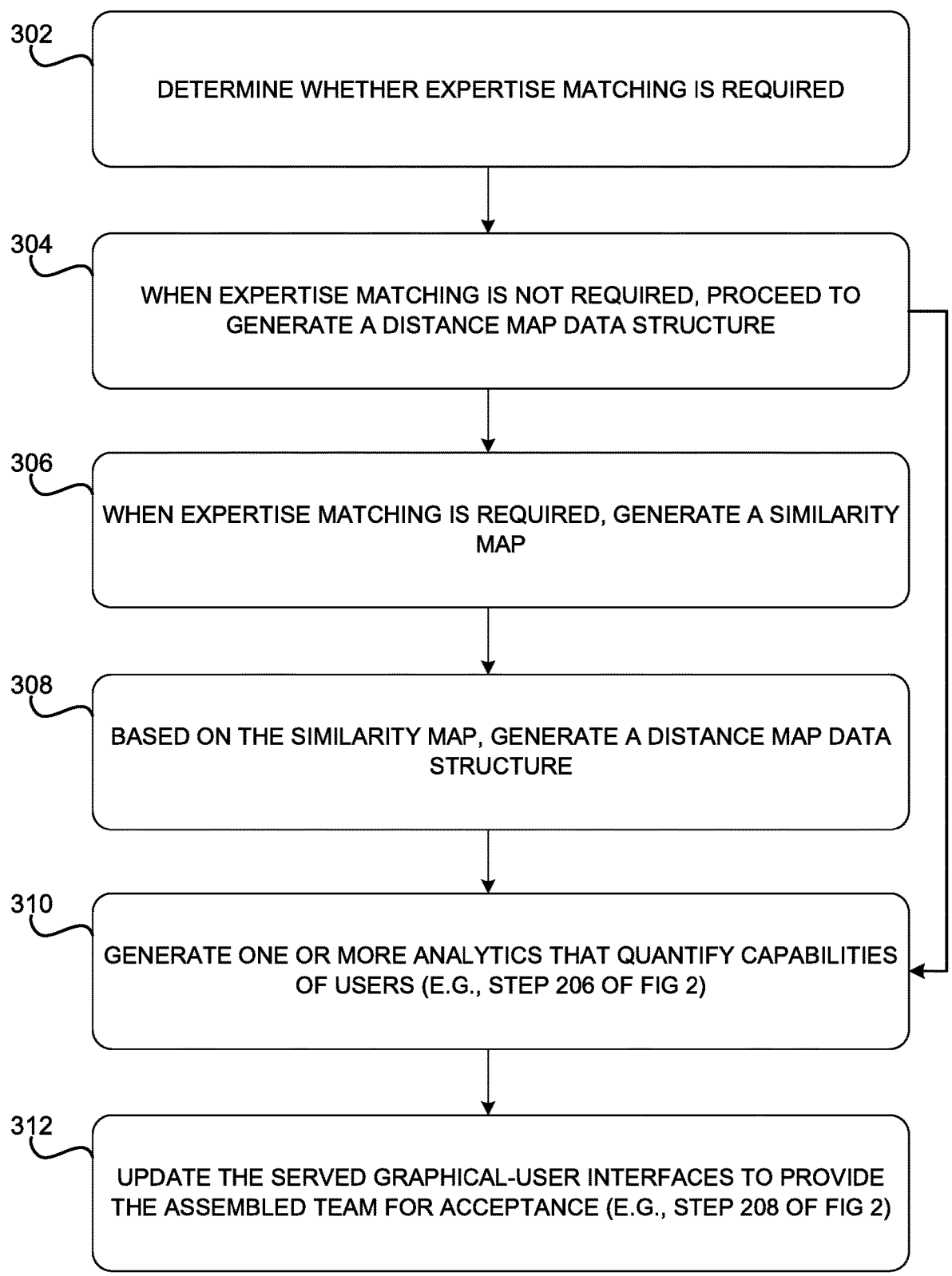
FIG. 3 is another flowchart illustrating an example process for automatically groups or teams of users of a social network or other connected network platform teams, according to aspects of the present disclosure.

FIG. 3 illustrates one specific example of an algorithm and/or process that may be executed by the data analytic engine 186 to generate various data analytics quantifying the capabilities of an assembled team. In one specific embodiment, the process may generate or otherwise identify one or more message paths (a specific type of data analytic) illustrating how an interested user may connect with or contact a second user (or multiple users) capable of solving a particular problem for which the user is interested. For example, the process may be used in the context of automatically routing trouble tickets through network enterprise software and systems. Stated differently, the process may identify an optimal path through which a troubleshooting ticket may be transmitted from a first user within the enterprise system to a second one or more users, wherein the second user(s) are capable of solving the problem articulated within the troubleshooting ticket.

The analytics may be displayed to a user (e.g., at a client device) via graphical user-interface, such as As illustrated, the process begins with determining whether expertise matching is required (operation 302). Stated differently, the system determined whether a specific expertise for solving a problem needs to be matched to users for inclusion in the group. For example, assume the problem being solved is to determine an outage of a network device in a computing network or environment. The system determines that the topic is network outage and in turn that the topic needs to be matched to users with the expertise of troubleshooting network outages and related issues.

The system may operate in two modes. In mode 1, the algorithm attempts to determine or otherwise identify "targets", which are users, whereas in mode 2, the algorithm attempts to determine or otherwise identify expertise sets, i.e., users may transmit messages to anyone with a specific set of expertise (a player's expertise is comprised of or otherwise based on the User data obtained for the user).

If expert matching is not required (mode 1), a distance map may be generated (operation 306), which is a data structure with one entry per user. Each entry in the data structure associates a user to a set of users that can be reached from the user, ordered by the distance of each player. Stated differently, the distance map data structure, for a given user, indicates the distance to each other user and orders the distance based on shortest distance. Then, at certain intervals (e.g., pre-defined), for each user, using the distance map, a particular user is chosen as the target.

If expert matching is required (mode 2), a similarity map is generated (operation 304). Referring to FIG. 1, the processing device 102 creates a similarity map, with one entry into the similarity map per user. Each entry in the generated similarity map effectively maps or otherwise associates a user to a set of users that have the same or similar expertise.

The similarity map is used to create a distance map (referred to as an "Expert Distance map") that is similar to the distance map in mode 1 (e.g., operation 306), with an additional constraint that users with the same expertise cannot be each other's targets (operation 308). Then, at certain intervals (e.g., pre-defined), for each user, using the distance map, a particular user is chosen as the target.

Referring again to FIG. 3, network metrics and statistics are generated (operation 310). For example, assume there are two types of social networks included in the system: Contact network—the network formed by players when they choose their contacts; and Relay network—a subset of the contact network, consisting of the nodes and edges that were used to relay messages. From both of these networks, the system may generate the following metrics are generated for every user: Clustering Coefficient; Eccentricity; Betweenness; Closeness; Indegree; Outdegree; HITS Score; Network Awareness*; and Number of Messages Relayed. *All of the "*" values are calculated using standard Java libraries, except for Network Awareness, which is calculated as the number of times a player relayed a message along the shortest path from him/her to the target, divided by the total number of messages relayed. Messages sent directly to the target are not counted in this score. Network Awareness is a measure developed by us specifically to assess a user's cognitive ability to leverage their networks. The remaining measures, developed by prior research, have been shown to provide insights about an individual's ability to engage in various organizational activities such as being innovative or being a leader.

In addition to these, the following network metrics are calculated: Average Clustering Coefficient; Characteristic Path Length; Diameter; Reciprocity; Transitive Triads; Cyclical Triads; Indegree; Outdegree; Betweenness; Closeness; Connectedness; Hierarchy; Efficiency; Density; Cliques; Components; and Cutpoints.

Referring again to FIG. 2, the served graphical user-interfaces are updated in real-time to provide the assembled team to users for acceptance (operation 208). Referring again to FIG. 1, the recommendation engine 206 updates the served graphical-user interfaces to display the newly assembled teams in conjunction with any other available resources that meet the criteria for solving the problem. In some embodiments, a report, summary, or other standardized format of information containing the assembled team and/or data analytic metrics may be generated and subsequently provided to a user. Example embodiments include an e-mail, csv files, Internet-accessible formats such as a markup document, pdf, and the like. In yet other embodiments, the personalized messages may be provided directly and automatically (e.g., via a separate "affiliate" dashboard/portal or through an API) to a $3^{rd}$ party computing system such as enterprise system-level software and servers.

The present application may be described in the context of computer-executable instructions, such as program modules, being executed by a computer. Generally, program modules include routines, programs, objects, components, data structures, and so forth, which perform particular tasks or implement particular abstract data types.

Figure 4:
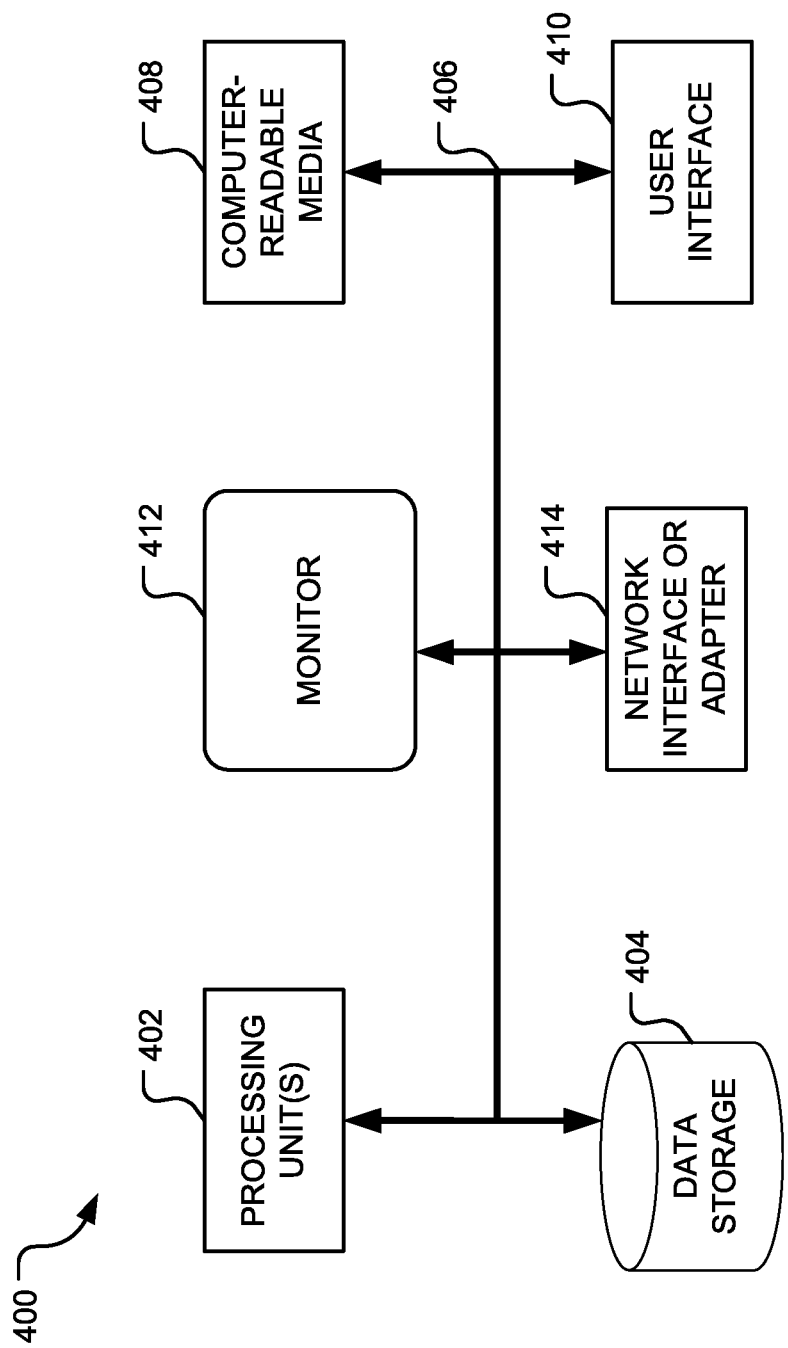
FIG. 4 is a block diagram illustrating a computing device for automatically assembling, according to aspects of the present disclosure.

FIG. 4 illustrates an example of a suitable computing and networking environment 400 that may be used to implement various aspects of the present disclosure described in FIGS. 1 and 2. As illustrated, the computing and networking environment 400 includes a general purpose computing device 400, although it is contemplated that the networking environment 400 may include other computing systems, such as personal computers, server computers, handheld or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvolatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 400. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory such as read only memory (ROM) and random access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 410 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 402 through a user interface 410 that is coupled to the system bus 406, but may be connected by other interface and bus structures, such as a parallel port, game port or a universal serial bus (USB). A monitor 412 or other type of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanism. A wireless networking component including an interface and antenna may be coupled through a suitable device such as an access point or peer computer to a network. In a networked environment, program modules depicted relative to the computer 400, or portions thereof, may be stored in the remote memory storage device.

What is claimed is:

1. A system for logically arranging users of a social networking platform into groups comprising:
   a computing device to:
      execute a query to generate a recommendation of a group of users capable of resolving a problem, the group of users identified from a plurality of users active in a social network deployed within a communications network, the query comprising:
         a set of preferences corresponding the problem; and
         information defining at least one of a skill and an expertise for each user of the plurality of users; and based on the set of preferences corresponding the problem and the information defining the at least one of the skill and the expertise for each user of the plurality of users, calculate a score for each user of the plurality of users by:
　　determining the information defining the at least one of the skill and the expertise for a user based on the query;
　　determining a weighting for the determined information based on the set of preferences,
　　calculating intermediate scores for each user in the plurality of users for each preference in the set of preferences; and
　　calculating the score for each user in the plurality of users based on the calculated intermediate scores for the user;
based on the score of each user of the plurality of users, include respective users in the group of users; and
cause the recommendation of the group of users to be displayed in real-time in a graphical user-interface at a client device.

2. The system of claim 1, wherein the computing device is further configured to:
generate a data structure determining a shortest distance from a first user of the plurality of users to a second user of the plurality of users; and
identifying the second user in the group of users as a target user for resolving the problem.

3. The system of claim 1, wherein the computing device is further configured to:
generate a similarity map identifying at least one user in the group of user with an identical expertise of at least one other user in the group of users.

4. The system of claim 1, wherein the generated recommendation is displayed in real-time at the client device for acceptance by a respective user of the one or more users of the team.

5. The system of claim 1, wherein the problem is identifying a path of connection between a user of the group of users and at least one other user of the group of users.

6. A method for logically arranging users of a social networking platform into groups comprising:
executing, using a computing device, a query to generate a recommendation of a group of users capable of resolving a problem, the group of users identified from a plurality of users active in a social network deployed within a communications network, the query comprising:
　　a set of preferences corresponding the problem; and
　　information defining at least one of a skill and an expertise for each user of the plurality of users; and
based on the set of preferences corresponding the problem and the information defining the at least one of the skill and the expertise for each user of the plurality of users, calculating, using the computing device, a score for each user of the plurality of users by:
　　determining the information defining the at least one of the skill and the expertise for a user based on the query;
　　determining a weighting for the determined information based on the set of preferences;
　　calculating intermediate scores for each user in the plurality of users for each preference in the set of preferences; and
　　calculating the score for each user in the plurality of users based on the calculated intermediate scores for the user;
based on the score of each user of the plurality of users, including, using the computing device, respective users in the group of users; and
causing, using the computing device, the recommendation of the group of users to be displayed in real-time in a graphical user-interface at a client device.

7. The method of claim 6, further comprising:
generating a data structure determining a shortest distance from a first user of the plurality of users to a second user of the plurality of users; and
identifying the second user in the group of users as a target user for resolving the problem.

8. The method of claim 6, further comprising:
generating a similarity map identifying at least one user in the group of user with an identical expertise of at least one other user in the group of users.

9. The method of claim 6, wherein the generated recommendation is displayed in real-time at the client device for acceptance by a respective user of the one or more users of the team.

10. The method of claim 6, wherein the problem is identifying a path of connection between a user of the group of users and at least one other user of the group of users.

11. A non-transitory computer readable medium encoded with instructions for logically arranging users of a social networking platform into groups, the instructions, executable by a processor device, comprising:
executing, using a computing device, a query to generate a recommendation of a group of users capable of resolving a problem, the group of users identified from a plurality of users active in a social network deployed within a communications network, the query comprising:
　　a set of preferences corresponding the problem; and
　　information defining at least one of a skill and an expertise for each user of the plurality of users; and
based on the set of preferences corresponding the problem and the information defining the at least one of the skill and the expertise for each user of the plurality of users, calculating, using the computing device, a score for each user of the plurality of users by:
　　determining the information defining the at least one of the skill and the expertise for a user based on the query,
　　determining a weighting for the determined information based on the set of preferences;
　　calculating intermediate scores for each user in the plurality of users for each preference in the set of preferences; and
　　calculating the score for each user in the plurality of users based on the calculated intermediate scores for the user;
based on the score of each user of the plurality of users, including, using the computing device, respective users in the group of users; and
causing, using the computing device, the recommendation of the group of users to be displayed in real-time in a graphical user-interface at a client device.

12. The non-transitory computer readable medium of claim 11, further comprising:
generating a data structure determining a shortest distance from a first user of the plurality of users to a second user of the plurality of users; and
identifying the second user in the group of users as a target user for resolving the problem.

13. The non-transitory computer readable medium of claim 11, further comprising:

generating a similarity map identifying at least one user in the group of user with an identical expertise of at least one other user in the group of users.

14. The non-transitory computer readable medium of claim 11, wherein the generated recommendation is displayed in real-time at the client device for acceptance by a respective user of the one or more users of the team.

15. The non-transitory computer readable medium of claim 11, wherein the problem is identifying a path of connection between a user of the group of users and at least one other user of the group of users.

* * * * *